3,521,841
MODULAR DROGUE PARACHUTE
Rex G. Finney, El Centro, and Albert J. Sidebottom, Seeley, Calif., assignors to the United States of America as represented by the Secretary of the Navy
Filed June 5, 1968, Ser. No. 734,693
Int. Cl. B64d 17/02
U.S. Cl. 244—145  6 Claims

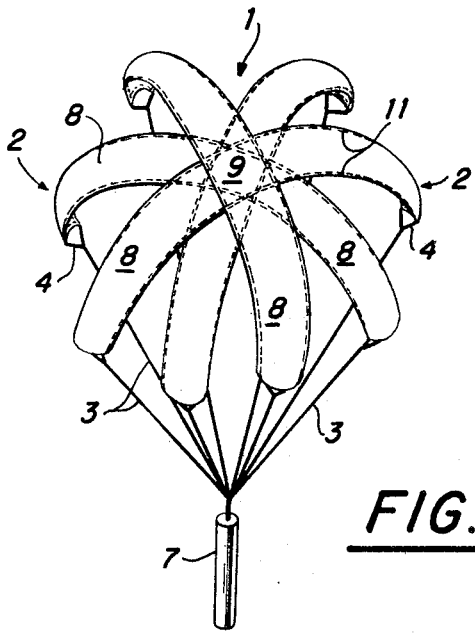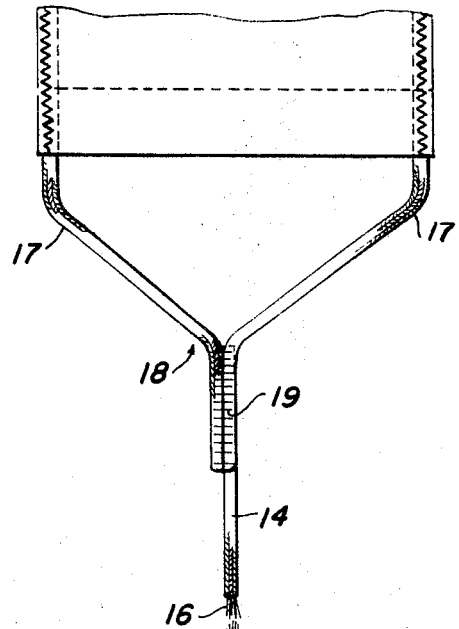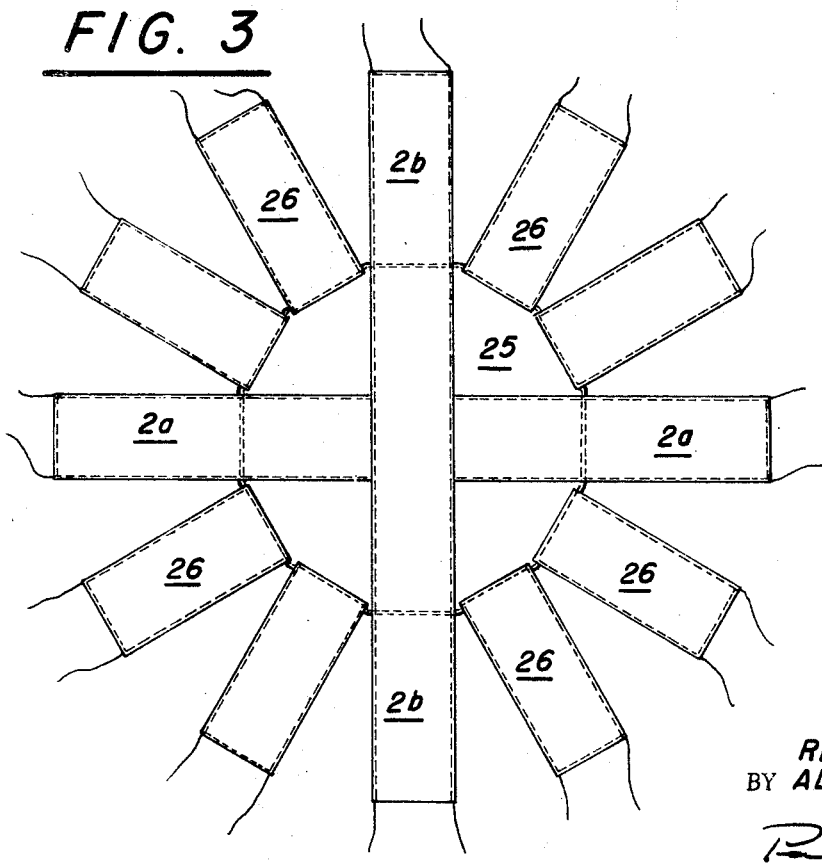
INVENTORS
REX G. FINNEY
BY ALBERT J. SIDEBOTTOM
ATTORNEYS United States Patent Office 3,521,841
Patented July 28, 1970

ABSTRACT OF THE DISCLOSURE

The canopy of the parachute is a spoke-like structure formed of rectilinear strips of material centrally criss-crossed and secured one to the other. A U-shaped bridle is coupled to the end of each strip and a load suspension line is secured medially to the U-shaped loop of the bridle. Most suitably, the load suspension line is inserted into the bridle and stitched to form a strong Chinese finger splice arrangement. A special construction is used for large-sized canopies to materially reduce bulkiness and weight.

The invention described herein may be manufactured and used by or for the Government of the United States of America for governmental purposes without the payment of any royalties thereon or therefor.

BACKGROUND OF THE INVENTION

The present invention relates to drogue parachutes of the type normally employed to impose a controlled braking force on objects or on loads released from aircraft or the like.

Such parachutes are used for a variety of purposes and the individual requirements vary significantly with each purpose. For example, drag racers utilize the braking force of the parachutes, although, as would be expected, the required characteristics for such parachutes differ considerably from those used for aircraft in which such factors as weight, bulkiness, air stability and trajectory are far more critical. The present improvement is concerned primarily with air operations although even in this particular area the drogue chutes are used and therefore constructed in differing manners. Some, for example, are used in systems which combine the drogue with a main canopy that takes over after the initial braking to assure a gentle landing. In others, the drogues control the drop from release to landing and, as will become apparent, this particular drogue-controlled drop is the primary concern of the present apparatus. In such operations the drogues permit a relatively fast fall with better control of the trajectory to achieve greater target accuracy for explosive loads such as runway cratering devices. As compared with the more conventional uses of the drogue parachutes, strength, maximum stability, controlled retardation, accurate trajectory and final load orientation become the primary concerns.

OBJECTS OF THE INVENTION

One of the objects of the present invention is to provide a parachute system capable of achieving a fast fall throughout its drop and of maintaining a relatively precise trajectory at least for a short period of time immediately following release of the system from an aircraft.

A related object is to provide a parachute capable of maintaining a reefed disposition for a period of time immediately subsequent to its release from the aircraft.

Another object is to provide a relatively lightweight, easily-packed parachute canopy secured to the load in a manner capable of producing the reefed disposition and of maintaining stability throughout its descent.

A further object is to produce a parachute system capable of achieving the reefed disposition during its initial release and of producing a desired orientation of the load upon contact.

Another object related to the foregoing object is to produce a parachute system capable of retarding and orienting a load released from an aircraft flying at a relatively low altitude.

Yet another object is to provide a parachute system capable of achieving the foregoing objectives, the canopy of the parachute being secured to the load in a particularly strong and reliable manner.

A further object is to provide a particular parachute canopy capable of achieving the foregoing objects, the canopy of the parachute being of adequate size to permit the drop of relatviely heavy loads and also being specially constructed to provide minimum weight and bulkiness to facilitate packing.

Other objects and advantages of the present invention will become more apparent in the detailed description which is to follow.

SUMMARY OF THE INVENTION

The objects of the present invention are achieved by using a canopy formed of a plurality of rectilinear gores criss-crossed one on the other and secured together at their medial portions, the gores extending radially in a spoke-like manner so as to be circumferentially spaced one from the other preferably at about 45° angles. Although it is preferred to use four gores which provide eight spokes the number can be increased or decreased to suit particular purposes. Each radial spoke of the canopy is secured to a load suspension line by means of a bridle line, the bridle line being in the form of a U-shaped loop having its free ends secured to the side seams of its gore. In the preferred arrangement, the web of the U-shaped loop has at least one of its off-center extents formed as a hollow casing and the load suspension line is inserted into this hollow portion. The insert-receiving portion of the web is secured, most suitably, by zig-zag stitching to an adjacent extent of the web, the result being that tension exerted on the load line and on the bridle serves to produce a compression of the bridle about the inserted extent of the load line. This particular manner of connecting the load line to the bridle is a simple, thoroughly reliable and secure manner of accomplishing the connection. A load line is secured to each bridle and the free ends of the load lines are coupled together to form a load securing loop or other appropriate connection for the load.

The use of a U-shaped bridle line secured to each of the radial spokes of the gores produces a parachute system having the desired characteristics contemplated in the foregoing objects. Upon initial release of the canopy from an aircraft or other flying objects such as a missile or rocket, the radial extents or spokes of the gores remain in a reefed position to produce an initial squid-like motion through the air. The bridle line secured to the side seams of the spokes tend to form the spokes into funnels which apply the air resistance or retarding force primarily to the central portion of the canopy at which the gores criss-cross. To accentuate this action, the end portions of each of the spokes also may be reduced in width.

The circumferentially spaced arrangement of the gores results in a limited retardation that permits the desired fast fall, although at the same time the retardation is sufficient to produce the vertical orientation of the load at contact even when the drop is from a relatively low altitude. The present invention further contemplates a special canopy construction which will be described later in detail.

BRIEF DESCRIPTION OF THE DRAWING

Preferred embodiments of the invention are illustrated in the accompanying drawing in which:

FIG. 1 is an illustration of the present parachute system showing the canopy open and supporting a falling load;

FIG. 2 is an enlarged fragmentary view showing an end portion of one of the gores of the canopy and the particular means securing this gore to the load; and FIG. 3 is a plan view of a modified canopy showing the canopy gores laid out in a flat horizontal position.

DESCRIPTION OF THE PREFERRED EMBODIMENTS

Referring to FIG. 1, the present parachute system is formed of several major components including a canopy 1 formed of rectilinear gore members 2 secured to load suspension lines 3 by special bridle lines 4. As shown in FIG. 2, the load suspension lines are gathered together at their free ends to form a loop 6 which in turn engages a load 7.

The principal features of the embodiment illustrated in FIG. 1 include the shaping and arrangement of gores 2, the use of bridle members 4, and the particular manner in which load lines 3 are secured to the bridle lines. As shown, gore members 2, of which there are four, are rectilinear in shape and are criss-crossed one on the other to form a spoke-like canopy structure having radially-extending, circumferentially-spaced free end portions or spokes 8. Medial portions 9 of the gores are secured one to the other by stitching and, preferably, each gore is secured to its criss-crossed or overlapping gore member by stitching extending along each side of the gores the full length of their overlap. Also, each side of each gore first is folded under and back upon itself to provide side seams having additional material for engagement by the stitching. A further feature is that, as shown in FIG. 2, the end portions of each of the gores are reduced in width so that engagement of this reduced width portion by birdles 4 tends to bow the ends into a funnel-like disposition functioning in a manner to be described during initial release of the canopy.

The parachute of the FIG. 1 embodiment may vary substantially in size depending upon the load to be supported. In addition, the number of gores criss-crossed one on the other also may vary to provide greater or fewer radially extending spokes to increase or decrease braking. As shown, the canopy has eight radial spokes spaced circumferentially at 45° angles. Two gores having four spokes would be spaced at 90° angles.

The parachute of FIG. 1 principally is intended for smaller load and, for example, might have a canopy diameter of about 30 inches. When substantially heavier loads are to be controlled, much larger canopies are constructed in the manner illustrated in FIG. 3 which subsequently will be described.

Load lines 3 and bridle lines 4 may be of any conventional type such as the usual parachute line formed of a nylon casing 14 enclosing a plurality of strengthening cords 16. In practice, the lines are formed in accordance with the specification of Mil-C-5040, the suspension lines being further identified as Type II while the bridle lines are Type III. Again, other types of lines may be found equally suitable.

Bridle lines 4 are U-shaped members having their free ends 17 securely stitched to the side seams of each gore, the medial or central portion 18 of each loop being descriptively identified as its web portion. Load lines 3 are secured to the web in a special manner that not only provides a secure connection but also is instrumental in the overall operation of the parachute system. Generally considered, the connection is made by inserting an end portion of the load line into a hollowed section provided in the web of the bridle. To achieve this joint, an off-center extent of the bridle is hollowed out by the removal of cord 16, although obviously, if the bridle does not include cords 16 or other strengthening fillers, no hollowing is needed Load line 4 then is inserted into the hollow portion and the load line is secured by stitching 19 extending through the hollow portion as well as its adjacent off center portion, these portions thus being drawn together into a tight loop encompassing the load suspension line. Obviously, when the joint is placed in tension by opposing forces exerted on the bridle line and the load line, the tight loop surrounding the load line is placed in compression to provide additional strength for the joint.

The manner in which the drogue parachute supports the load during the drop is shown in FIG. 1 where it will be noted that the modular canopy is fully extended and that load 7 is oriented in a vertically-descending disposition. When, as is contemplated, the load is in the form of a shaped charge to be dropped in a precise manner on a runway or other target, the vertical disposition is important because it is essential that the charge deeply imbed itself in the target prior to detonation.

Other aspects of the drop are equally important and the drogue must have certain characteristics to achieve the desired results. Thus, in operations such as the drop of a shaped charge, the load normally is released at a relatively low altitude and it must fall in a precise trajectory with maximum speed or force. However, trajecting and speed still must be so controlled that the restraining force of the canopy is capable of assuring the substantially vertical position of the charge when it hits. The size of the parachute relative to the load, as well as the spacing of the gores is, of course, one of the controlling factors.

Another most significant factor is to improve trajectory and speed by causing the parachute to assume what is known as a reefed or "squid" position during the initial part of its free fall. More specifically, it is desired to have the parachute maintain a relatively unopen, reefed position for a predetermined interval immediately following its release. A reefed position may be visualized as one in which the bridle ends of the gores remain close together so that spoke portions 8 of the gores extend longitudinally rather than being spread radially. In such a disposition which, it will be noted, permits a squid-like movement, the spokes offer little resistance to movement and the major portion of the restraining force is achieved by the central, criss-crossed area of the gores.

Obviously any parachute will require some interval of time in which to fully open and, during this interval, will to some small degree, demonstrate a squid-like movement. In the present parachute, this movement is controlled and rendered more stable by the use of bridle lines 4 which couple the plural load lines to the gores. In particular, it appears from numerous test drops, that the bridles provide a positive control at the end portions of the gores to cause these end portions to bow or assume a funnel-like shape which aerodynamically produces increased stability as well as concentrates the restraining force at the criss-crossed center of the parachute. Further, the bridles apparently tend to distribute the load evenly.

In any event it seems clear that criss-crossed radially-spaced gores individually coupled by bridles to the load support lines achieve a better-controlled squid movement. It also is quite possible that the particular spliced manner in the bridles are secured to the load lines has a beneficial effect and, most certainly, this particular splice assures adequate strength for this critical connection. Obviously, the FIG. 1 position of the parachute eventually must be achieved to assure the vertical disposition of the load. Experimentation taking into account such factors as the altitude of the release, the weight and shape of the load and trajectory can determine the size of the parachute and the number of gores most suitable for the particular operation.

FIG. 3 illustrates a specially-constructed canopy especially suited for heavy loads. Thus, for example, the parachute of FIG. 3 might be about ten times the size of the one shown in FIG. 1. The advantage of the FIG. 3 constructed is primarily a reduction of bulk and weight permitting the parachute to be packaged in a smaller container. The principal difference in the FIG. 3 modification is that, instead of criss-crossing all of gores 2, only a pair of these gores, identified by numerals 2a and 2b are criss-crossed and stitched one to the other. Further, a circular crown piece 25 is employed and gores 2a and 2b criss-cross this piece at right angles. To provide the other radially-extending spoke portions, short pieces 26 are stitched to the peripheral edges of piece 26 between the criss-crossed gores. As may be noted, all overlaps of the pieces are stitched together in a conventional manner.

Such a construction minimizes bulk since it avoids overlap or layering at the center of the parachute. Thus, if the FIG. 1 construction were employed to produce a parachute of the size contemplated by FIG. 3, six gores would be needed and each would overlap at its center and result in excessive bulk. Otherwise, the FIG. 3 parachute can be formed in a manner similar to FIG. 1 using the bridles and special connections already described. Also, the FIG. 3 parachute behaves in the manner previously described and, as will be apparent, can be used either for larger parachutes or for parachutes which must have an increased number of gores.

Obviously many modifications and variations of the present invention are possible in the light of the above teachings. It is therefore to be understood that within the scope of the appended claims the invention may be practiced otherwise than as specifically described.

What is claimed is:

1. A drogue parachute comprising:
 a canopy formed of at least three rectilinearly-shaped gores criss-crossed and secured medially one to the other, said gores having free end portions substantially equal in length and extending radially in a circumferentially uniformly spaced arrangement forming a spoke-like canopy structure,
 a bridle line having its free ends secured one to each side of each of said gores for forming a U-shaped loop having a medial web section, and
 a plurality of elongate load-suspension lines each having one of its ends secured to a central section of said medial web section, the other end portions of said suspension lines being formed into a load-suspension means.

2. The drogue parachute of claim 1 wherein said free ends of each gore are reduced in width and said bridle line is secured to the side edges of said reduced width portions.

3. The drogue parachute of claim 1 wherein an off-center extent of each of said medial web sections is hollow and said load suspension lines are inserted each into one of said hollow off-center extents.
 said parachute further including:
 stitch means extending through each of said line-filled hollow web sections and through an adjacent extent of the medial web section for drawing said web sections into a closed loop and for tightly securing said inserted suspension line in said closed loop.

4. The drogue parachute of claim 1 wherein only two gores are criss-crossed substantially at right angles one to the other,
 said parachute canopy further including:
 a circular crown piece, and
 a plurality of spoke-like sections extending radially outwardly of the crown piece between said circumferentially-spaced gores,
 said spoke-like sections being stitched to the periphery of said crown piece and said gores being stitched one to the other and to said crown piece,
 said bridle lines being secured to the end portions of said gores and said spoke-like sections.

5. For use with a load-carrying parachute canopy formed of at least three rectilinearly-shaped gores secured medially one to the other and having free end portions extending radially and in a circumferentially spaced arrangement forming a spoke-like canopy structure,
 apparatus for securing said canopy to said load, said apparatus including:
 a bridle line having its free ends secured one to each side of each of said gores for forming a U-shaped loop having a medial web section, and
 a plurality of elongate load-suspension lines each having one of its ends secured to a central section of said medial web section, the other end portions of said suspension lines being formed into a load-suspension means.

6. The apparatus of claim 5 wherein an off-center extent of each of said medial web sections is hollow and said load suspension lines are inserted each into one of said hollow off-center extents,
 said parachute further including:
 stitch means extending through each of said line-filled hollow web sections and through an adjacent extent of the medial web section for drawing said web sections into a closed loop and for tightly securing said inserted suspension line in said closed loop.

References Cited

UNITED STATES PATENTS

| | | | |
|---|---|---|---|
| 2,511,263 | 6/1950 | Hiscock | 244—145 |
| 2,745,615 | 5/1956 | Fogal | 244—145 |
| 3,104,856 | 9/1963 | Knacke et al. | 244—145 |
| 3,331,573 | 7/1967 | Winker et al. | 244—145 |

MILTON BUCHLER, Primary Examiner

J. E. PITTENGER, Assistant Examiner